United States Patent [19]

Hanawa et al.

[11] 4,132,197
[45] Jan. 2, 1979

[54] JET-STREAM CONTROL COMBUSTION ENGINE

[75] Inventors: Akio Hanawa; Noriyuki Miyamura; Yasuhiro Oosugi, all of Kyoto, Japan

[73] Assignee: Mitsubishi Jidosha Kogyo Kabushiki Kaisha, Japan

[21] Appl. No.: 808,524

[22] Filed: Jun. 21, 1977

[30] Foreign Application Priority Data

Mar. 22, 1977 [JP] Japan .................................. 52/31850

[51] Int. Cl.² ............................................ F02B 19/16
[52] U.S. Cl. ................................ 123/75 B; 123/191 S
[58] Field of Search ............. 123/75 B, 32 ST, 32 SP, 123/191 S, 191 SP, DIG. 9, 32 C, 32 D, 33 D

[56] References Cited

U.S. PATENT DOCUMENTS

| | | | |
|---|---|---|---|
| 3,092,088 | 6/1963 | Goossak et al. | 123/75 B X |
| 3,853,097 | 12/1974 | Kume | 123/32 SP X |
| 3,921,607 | 11/1975 | Kawamoto | 123/32 SP X |
| 3,924,592 | 12/1975 | Miyaki et al. | 123/75 B X |
| 3,933,134 | 1/1976 | Yagi et al. | 123/75 B X |
| 3,965,881 | 6/1976 | Sakurai et al. | 123/32 ST X |
| 3,967,595 | 7/1976 | Yagi et al. | 123/75 B X |
| 3,994,268 | 11/1976 | Okunishi et al. | 123/32 ST X |
| 4,023,543 | 5/1977 | Ishikawa | 123/32 SP X |
| 4,076,001 | 2/1978 | Kuno et al. | 123/75 B X |

FOREIGN PATENT DOCUMENTS

| | | | |
|---|---|---|---|
| 2410508 | 3/1974 | Fed. Rep. of Germany | 123/75 B |
| 2508782 | 2/1975 | Fed. Rep. of Germany | 123/75 B |

*Primary Examiner*—Ira S. Lazarus
*Attorney, Agent, or Firm*—Robert E. Burns; Emmanuel J. Lobato; Bruce L. Adams

[57] ABSTRACT

A jet-stream control combustion engine comprising an auxiliary intake system in a cylinder head leading to an internal combustion chamber, besides an intake system and an exhaust system. The auxiliary intake system is equipped with a hollow cylindrical jet piece fitted into a through-hole from the combustion chamber side, a hollow cylindrical jet body fitted from the opposite side of the through-hole, and an auxiliary intake passage opened and closed by a jet valve fitted inside of the jet body, wherein the auxiliary intake passage communicates with the internal combustion chamber via an injection chamber formed in the jet piece and an injection port thereof. The jet piece and the jet body are screwed and fixed relative each other in such a way as to compressibly contact with receiving surfaces of the cylinder head, so that the structure gets simplified and facilitates to assembly and disassembly with high parts-interchangeability.

14 Claims, 5 Drawing Figures

JET-STREAM CONTROL COMBUSTION ENGINE

BACKGROUND OF THE INVENTION

In conventional automotive internal combustion engines, efficiency of intake to the combustion chamber has been low especially when the passage is choked by the throttle valve. Further, ignitability and combustibility drop during idling and light-load operation when the air-fuel mixture flows into the combustion chamber at a low rate.

Generally, such deterioration in ignitability and combustibility is solved by supplying rich mixtures, i.e., at low air-fuel ratio, that burns well. But this solution entails an increase in fuel cost and such noxious unburned emissions as hydrocarbons and carbon monoxide.

Also, especially with the object of decreasing poisonous nitrogen-oxide emissions, it has recently been proposed to burn such lean mixtures whose air-fuel ratios are substantially higher than the stoichiometric value, and to burn air-fuel mixtures with part of the exhaust gas recirculated from the exhaust system of the engine. In both cases, however, the mixture ignitability and combustibility drop, which in turn impairs the car's driveability and fuel economy.

SUMMARY OF THE INVENTION

This invention relates to the construction of an injection port, an auxiliary intake passage through which air or lean mixture is introduced to the injection port and a valve that opens and closes the auxiliary intake passage in a jet-stream control combustion engine proposed to eliminate the afore-mentioned problems, as especially suited for automotive use. The proposed engine is a spark-ignited reciprocating engine whose combustion chamber has said injection port, in addition to the ordinary intake portion the conventional engine, through which air or lean mixture is forcibly injected by a vacuum produced in the cylinder during the intake stroke, thereby imparting a high swirl or turbulence to the air-fuel mixture flowing into the combustion chamber and scavenging exhaust gas from the vicinity of the spark-plug gap, and, consequently, enhancing the mixture ignitability and combustibility, enlarging the lean-mixture combustible range, and improving the car's fuel economy and driveability.

A primary object of this invention is to provide a jet-stream control combustion engine that is compact in size, simple in construction, and low in cost.

Another object of this invention is to provide a jet-stream control combustion engine that is easy to assemble and disassemble, with a high parts-interchangeability.

Still another object of this invention is to provide a jet-stream control combustion engine that always assures the desired intake flow rate through the auxiliary intake passage, unaffected by the assembled condition.

Yet another object of this invention is to provide a jet-stream control combustion engine whose injection port is made of such parts as can be readily cooled, thereby preventing the occurrence of such inconveniences as preignition and heat loss.

A further object of this invention is to provide a jet-stream control combustion engine wherein the auxiliary intake passage is highly gas-sealed.

The aforesaid objects of this invention are effectively achieved by a jet-stream control combustion engine comprising an intake port opened and closed by an intake valve, an exhaust port opened and closed by an exhaust valve and a spark plug which are disposed in the wall defining the upper limit of the combustion chamber formed below the cylinder head, a through-hole extending from the upper surface of said cylinder head to said wall, a hollow cylindrical jet piece press-fitted into said through-hole from the combustion chamber side, a hollow cylindrical jet body fitted into said through-hole from the upper side. The jet piece and body being fixed in the cylinder head, so as to rest on the respective receiving surfaces formed therein, by screwing the internal thread cut on the inner surface at the upper end of the jet piece onto an external thread cut on the outside surface at the lower end of the jet body. A mushroom-shaped jet valve is slidably fitted in the jet body, and an annular auxiliary intake passage is formed in the lower part of the jet body between the outside surface of the stem of the jet valve and the inside surface of the jet body. The auxiliary intake passage communicates through a hole made in the jet body with an auxiliary intake passage formed in the cylinder head and opening to an injection chamber defined by the inside surface of the jet piece and the head end of said jet valve. The opening is closed by the face of the jet valve on its coming in contact with a valve seat formed at the lower end of the jet body. The injection chamber communicates with the combustion chamber through an injection port made in said jet piece.

DESCRIPTION OF THE PREFERRED EMBODIMENTS

Figure 1:
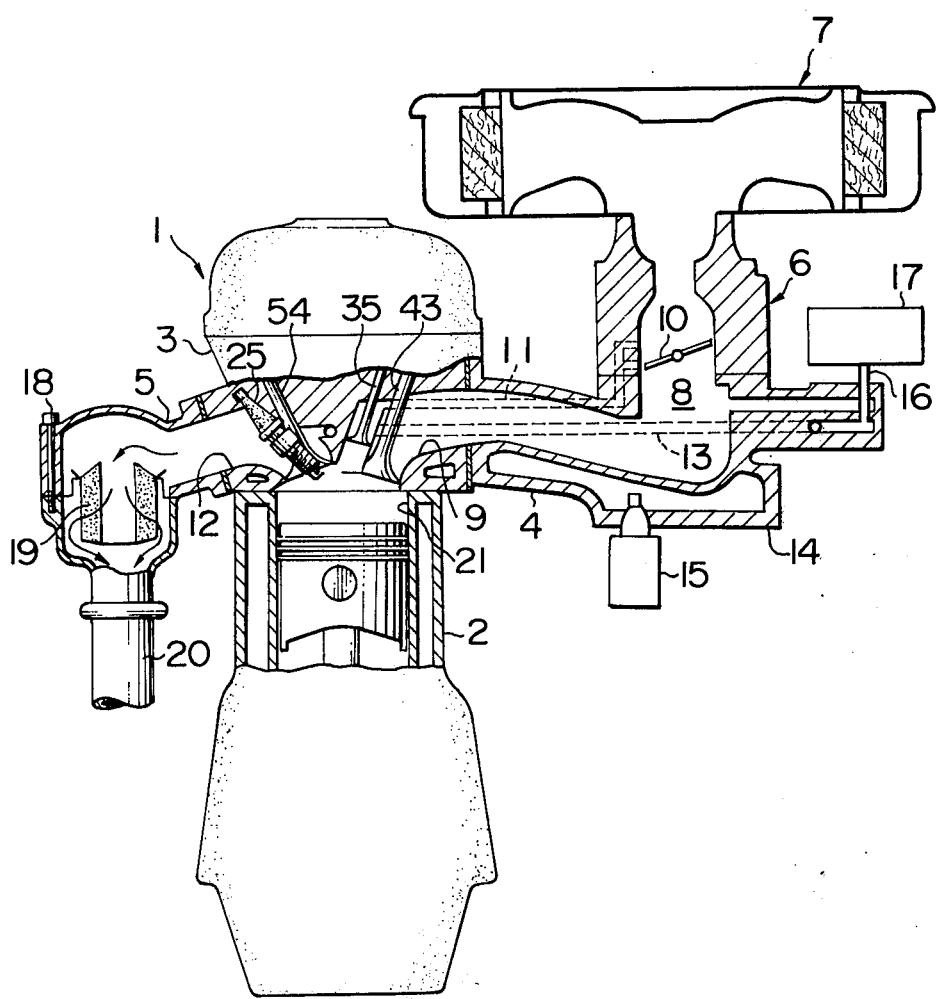
FIG. 1 is a schematic illustration of an embodiment of this invention.

A body 1 of an automotive four-cycle multi-cylinder gasoline engine is contoured principally by a cylinder block 2 and a cylinder head 3. The cylinder head 3 is fixed with an intake manifold 4 on one side and an exhaust manifold 5 on the other side. A carburetor 6 is fixed on the intake manifold 4, and an air cleaner 7 is mounted on the carburetor 6. Air cleaned by the air cleaner 7 passes through a main intake passage 8 formed in the carburetor 6 and intake manifold 4 to an intake port 9 formed in the cylinder head 3. In the main intake passage 8 in the carburetor 6 is provided a throttle valve 10 that is interlockingly opened and closed by the operation of an accelerator-pedal not shown. An auxiliary intake passage 11, which sucks part of the incoming air mainly from upstream of the throttle valve 10, opens in the wall of the main intake passage 8.

The intake manifold 4 is integrally formed with part of an exhaust-gas recirculation passage 13 whose one end communicates with an exhaust port 12 formed in the cylinder head 3 and the other end with the main intake passage 8 in the intake manifold 4.

A cooling water passage 14 that constitutes a heat riser is provided below the intake manifold 4, with a thermo-sensor 15 fitted in the passage 14.

A control valve 16 to regulate the recirculated quantity of exhaust gas is provided midway in the exhaust-gas recirculation passage 13, and the valve 16 is controlled by an actuating device 17 that provides the desired opening in accordance with the operating condition of the engine.

Concretely, the actuating device 17 may be one that mechanically interlocks with the opening of the throttle valve 10, one that pneumatically controls in accordance with the level of intake vacuum occurring in a specific position in the main intake passage 8 that is established chiefly by its relation with the throttle valve 10, or the like.

The thermo-sensor 15 controls the recirculated exhaust gas control valve 16 or means for controlling ignition advance angle not shown, detecting the time when the engine is cold or overheated from the temperature of the engine cooling water.

Further, the exhaust manifold 5, which communicates with the exhaust port 12 of each cylinder, is made in two, top and bottom, sections fastened together by a bolt 18. The core of the exhaust manifold 5 contains a vertically disposed radial-flow type catalyst bed 19 through which exhaust gas flows as indicated by the arrow in FIG. 1. The lower part of the exhaust manifold 5 connects with an exhaust pipe 20.

The internal construction of the engine body 1 will be described by reference to FIGS. 2 through 4. A hemispherical combustion chamber 24 is formed, being defined by the internal circumference of a cylinder 21, the top of a piston 22 and the hemispheric recess 23 in the cylinder head 3. The intake port 9 and exhaust port 12 open in their respective positions in the recess 23.

A spark plug 25 is screwed into a through-hole 26 provided in the hemispheric recess 23, with the spark gap 27 of the spark plug 25 being disposed on or in the vicinity of the extension of said recess 23.

The hemispheric recess 23 is also provided with a through-hole 28 opening adjacent to the spark gap 27. The through-hole 28 is press-fitted with a hollow cylindrical jet piece 30 from the side of the combustion chamber 24, and inserted with a jet body 32 from the opposite side. By screwing together the external thread cut on the outside surface at one end of said jet body 32 and the internal thread on the inner surface at one end of the jet piece 30, they are fixed to the cylinder head 3 so as to rest on the respective receiving surfaces 33 and 34 formed therein.

A mushroom-shaped jet valve 35 is slidably fitted in the jet body 32. In the internal thread side end of the jet body is formed an annular auxiliary intake passage 36 between the outside surface of the stem of said jet valve 35 and the inside surface of the jet body 32. This auxiliary intake passage 36 communicates with an auxiliary intake passage 38 formed between the inside surface of the through-hole 28 and the outside surface of the jet body 32, through a plurality of holes 37 made in the jet body 32. The passage 38 communicates with an auxiliary intake passage 39 formed in the cylinder head 2, and the passage 39 with the auxiliary intake passage 11. The auxiliary intake passage 36 opens in a small injection chamber 40 defined by the inside surface of the jet piece 30 and the head end of the jet valve 35. This opening is closed by the face of the jet valve 35 when it comes in contact with a valve seat 41 formed at the lower end of said jet body 32.

That portion of the jet piece 30 which is exposed in the combustion chamber 24 is formed like a hollow shell. This shell portion has an injection port 42 through which the combustion chamber 24 communicates with the injection chamber 40. The injection port 42 is located in the vicinity of the spark gap 27 of the spark plug 25 and substantially on the extension of the aforementioned recess. Also, the injection port 42 is directed toward the gap 27 and, further, in the direction in which the air-fuel mixture sucked through the intake port 9 into the combustion chamber 24 swirls as indicated by the arrow (a) in FIG. 4.

Figure 2:
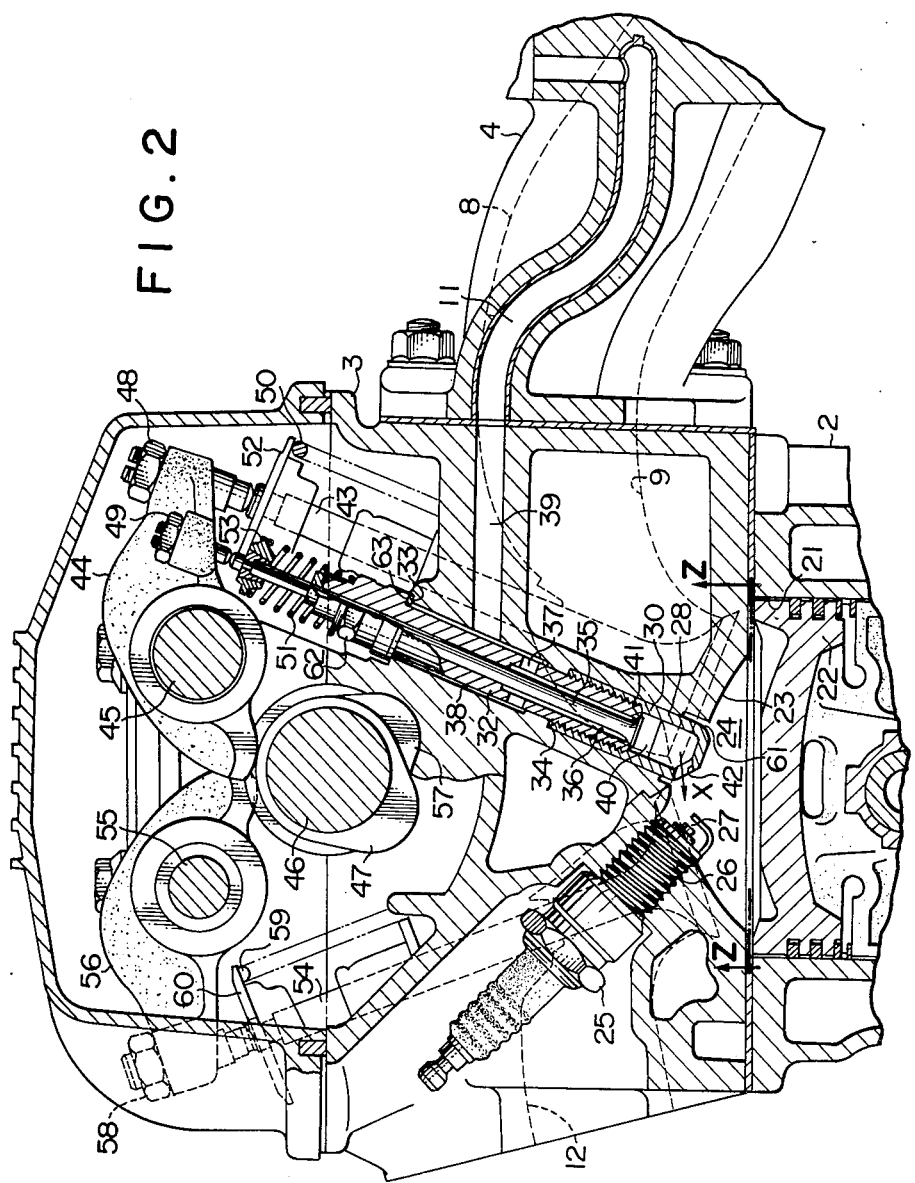
FIG. 2 is a cross-sectional view, on an enlarged scale, of the principal portion of FIG. 1.
Figure 3:
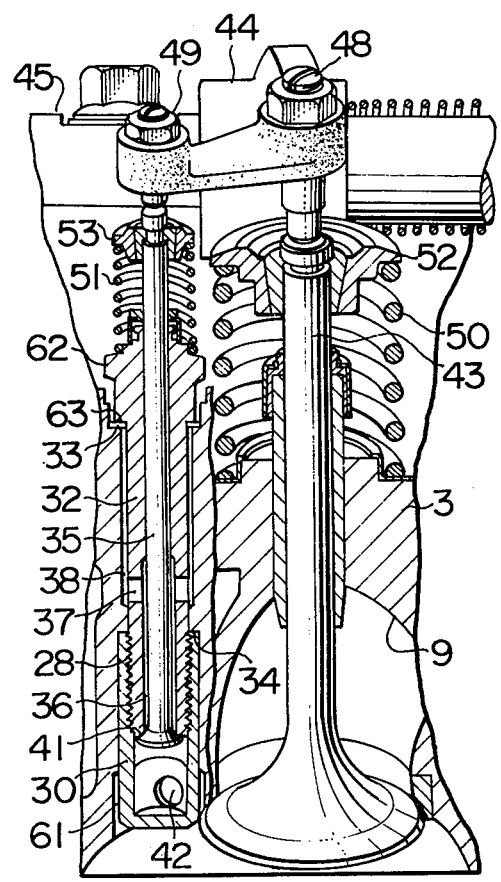
FIG. 3 is a cross-sectional view enlarging the principal portion of the same embodiment.
Figure 4:
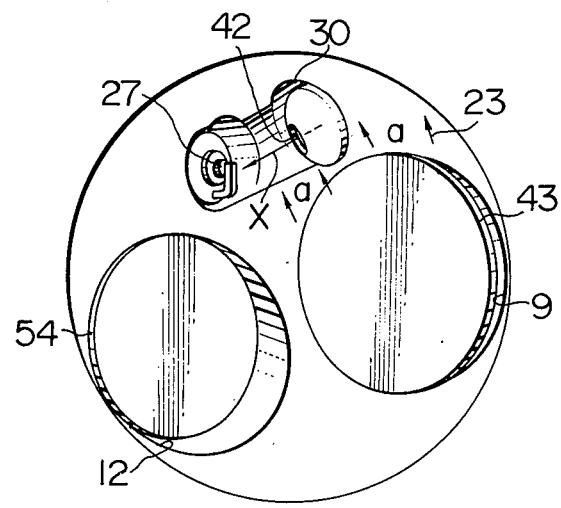
FIG. 4 is a view looking in the direction of the arrow Z—Z in FIG. 2.

In FIGS. 2 and 4, the direction of injection through the injection port 42 is indicated by the arrow (X).

An intake valve 43 that opens and closes the intake port 9 and the jet valve 35 are mushroom valves actuated by a common rocker arm 44 that is pivoted on a rocker shaft 45 and operated by a contacting cam 47 pivoted on a cam shaft 46 that is rotated by the engine. The arm section of the rocker arm 44 opposite to the end that contacts the cam 47 is divided into two branches which are respectively screwed with adjust screws 48 and 49. One end of the adjust screw 48 contacts the upper stem end of the intake valve 43, and that of the adjust screw 49 contacts the upper stem end of the jet valve 35.

Reference numerals 50 and 51 designated valve springs, and 52 and 53 retainers.

An exhaust valve 54 that opens and closes the exhaust port 12 is actuated by a rocker arm 56 pivoted on a rocker shaft 55. The rocker arm 56 is operated by a contacting cam 57 pivoted on the cam shaft 46.

Reference numeral 58 designates an adjust screw, 59 a valve spring, and 60 a retainer.

Since the axis of the through-hole 28 is parallel to the axis of the intake valve 43, the through-hole 28 and the guide hole for the intake valve 43 can be perforated simultaneously, thus reducing the number of machining works required.

This through-hole 28 is also situated as close as possible to the rocker shaft 45, whereby the lifting amount of the jet valve 35 is decreased, which in turn reduces moment of inertia and acceleration thereof. As a consequence, the load imposed on the valve system is reduced and its reliability increased. The inside diameter of the combustion-chamber-side end of the through-hole 28 is slightly larger than the outside diameter of the jet piece 30, so that a gap 61 is left between the outside surface of the lower end of the press-fitted jet piece 30 and the inside surface of the combustion-chamber-side end of the through-hole 28. This gap facilitates warming the jet piece 30 immediately after the start-up of the cold engine and, subsequently, conserving its temperature. Further, it serves also as a guide when press-fitting the jet piece 30. Since the jet piece 30 is press-fitted in the cylinder head 3, the injection port 42 can be positioned easily and the jet piece 28 does not need to be supported when screwing in the jet body 32.

In this embodiment, the jet body 32 is formed with a hexagonal portion 62. The diameters of the valve spring 51 and the retainer 53 are smaller than the diameter of the hexagonal portion 62. Therefore, the jet body 32 fitted with the jet valve 35 can be screwed into the jet piece 30 easily by wrenching the hexagonal portion 62 with a box wrench, in conjunction with the valve spring 51 and retainer 53 mounted thereon, so that the automatic assembling at production process or the maintenance under use may be done very easily.

Further, the jet piece 30 is fixed to the cylinder head 3 by not only being press-fitted but also screwed into the jet body 32. Accordingly, the jet piece 30 is perfectly prevented from coming off.

On the screwed portions of the jet piece 30 and jet body 32 is applied a filler of high heat-conductivity containing metal powder. This filler strengthens the gas sealing at the screwed portion and enhances the heat conduction from the jet piece 30 to the jet body 32.

As described before, the temperature of the jet piece 30 can be raised and conserved well, especially in the vicinity of its injection port 42, due to the presence of the gap 61. When overheated, the excess heat is conducted to the jet body 32 and the contacting cylinder head 3 in which said jet piece 30 is press-fitted. Further, it is effectively cooled by the cooling water flowing in the cylinder head 3. Therefore, such inconvenicences as heat loss and preignition due to the overheating of the jet piece 30 are prevented.

When the main intake valve 43 and jet valve 35 are opened during the intake stroke by the motion of the rocker arm 44, air-fuel mixture produced in the carburetor 6 mixes with the recirculated exhaust gas in the intake manifold 4. By the action of a vacuum established in the combustion chamber 24, the mixture is then sucked through the intake port 9 into the combustion chamber 24, swirling along the inside surface of the cylinder 21 as indicated by the arrow (a) in FIG. 4. Meantime, part of sucked air cleaned by the air cleaner 7 is drawn mainly from upstream of the throttle valve 10 in the main intake passage 8 into the injection chamber 40 through the auxiliary intake passages 11, 39 and 38, the holes 37, and the auxiliary intake passage 36.

The air thus drawn into the injection chamber 40 is then injected through the injection port 42 into the combustion chamber 24 to scavenge the burned gas from around the spark gap 27 and intensify said mixture swirl by descending along the hemispheric recess 23 of the cylinder head 3 and the inside surface of the cylinder 21.

Consequently, this jet stream causes the mixture drawn into the combustion chamber 24 to swirl strongly, mixes with said mixture to produce a leaner mixture, and scavenges the vicinity of the spark gap 27, thus enhancing the ignitability and combustibility of the air-fuel mixture.

When the spark gap 27 ignites the air-fuel mixture in the later stage of the compression stroke, part of flame enters through the injection port 42 into the injection chamber 40. Because the injection chamber 40 is small and a high turbulence is generated therein by the air-fuel mixture incoming from the combustion chamber 24 during the compression stroke, the mixture drawn into the injection chamber 40 burns rapidly to generate a high temperature and pressure. The flame is forcibly injected through the injection port 42 into the combustion chamber 24. This jet stream also accelerates the combustion proceeding in the combustion chamber 24.

The improving effect of the jet stream, which is injected through the injection port 42 into the combustion chamber 24, on the ignitability and combustibility of the air-fuel mixture varies greatly with its direction, force and flow rate. To ensure a good effect, such variables must be held within the experimentally established limits.

This embodiment is constructed as described hereunder so as to always insure a stable jet stream by eliminating a change in its flow rate, direction or force due to the assembling condition of the jet body 32 or other factors lying between the auxiliary intake passages 11 and 39 and the injection chamber 40 through which the sucked air is introduced.

Namely, the opening of the auxiliary intake passage 39 in the auxiliary intake passage 38 and the holes 37 connecting the auxiliary intake passages 38 and 36 are staggered with respect to the axis of the jet valve 35. At the same time, the plurality of holes 37 are symmetrically disposed with respect to said axis. Further, the holes 37 and the valve face 41 are separated wide enough to permit the provision of the long auxiliary intake passage 36. Therefore, the air incoming with a given direction angle from the auxiliary intake passage 39 into the auxiliary intake passage 38 is freed of its directionality on striking the jet body 32. Then, the air is introduced through the holes 37 into the auxiliary intake passage 36. This results in a constant flow resistance and a stable flow rate, irrespective of the position of the holes 37 in the direction of rotation on the axis of the jet valve 35.

The air drawn through the plurality of holes 37 into the annular auxiliary intake passage 36 uniformly descends therein toward the injection chamber 40 without causing a circumferential swirl. Since the auxiliary intake passage 36 is long enough, the air is perfectly uniformed during its descent and injected evenly from around the entire circumference of the face of the jet valve 35 into the injection chamber 40. This injected air does not affect the jet stream injected from the injection port 42 into the combustion chamber 24, thereby assuring the stability of the direction and force of said jet stream.

In the above-described embodiment, the jet body 32 serves as a guide for the jet valve 35, with its lower end serving as a valve seat and upper hexagonal portion 62 as a bolt head. Therefore, the jet body 32 must be made of a material with such strength, durability, wear resistance and other properties as are enough to permit the satisfactory performance of the aforesaid three functions. In this embodiment, spheroidal-graphite or malleable cast iron is employed as the material of the jet body 32.

Figure 5:
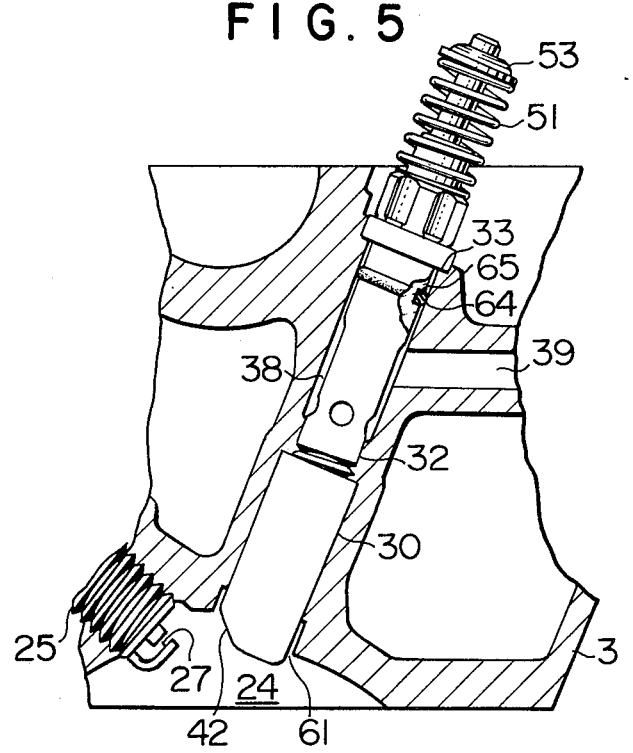
FIG. 5 is an enlarged view of the principal portion of a modified embodiment of this invention.

In the above embodiment, further, a metal seal ring 63 is provided on the receiving surface 33 to gas-seal the auxiliary intake passage 38. But a circular groove 64 is cut in the outside surface of the jet body 32, so that the jet body 32 is fitted in the through-hole 28 in conjunction with an elastic ring 65 fitted in the groove 64, as shown in FIG. 5. Since the elastic ring 65 performs gas-sealing, the valve body 32 is directly contacted with the receiving surface 33, without interposing a seal ring therebetween.

In FIG. 5, the parts substantially similar to those of the embodiment in FIGS. 1 through 4 are represented by similar reference numerals.

What is claimed is:

1. A jet-stream control combustion engine comprising, means defining an intake port opened and closed, an intake valve opening and closing said intake port, means defining an exhaust port opened and closed, an exhaust valve opening and closing the exhaust port and a spark plug disposed in a wall defining an upper limit of a combustion chamber formed below the cylinder head, means defining said combustion chamber, means defining a through-hole extending from the upper surface of said cylinder head to said wall, a hollow cylindrical jet piece press-fitted into said through-hole from the combustion chamber side, a hollow cylindrical jet body fitted into said through-hole from the upper side, said jet piece and body being fixed in the cylinder head, so as to rest on respective receiving surfaces formed therein, by screwing an internal thread on an inner surface at an upper end of the jet piece onto an external thread on an outside surface at a lower end of the jet body, a mushroom-shaped jet valve slidably fitted in said jet body, and means defining an annular auxiliary intake passage in a lower part of said jet body between the outside surface of the stem of said jet valve and the inside surface of said jet body, means defining an auxiliary intake passage in said cylinder head, said auxiliary intake passage communicating through holes made in said jet body with said auxiliary intake passage formed in said cylinder head and opening to an injection chamber defined by the inside surface of said jet piece and the head end of said jet valve, said opening being closed by the face of said jet valve on its coming in contact with a valve seat formed at the lower end of said jet body, and said injection chamber communicating with said combustion chamber through an injection port made in said jet piece.

2. A jet-stream control combustion engine in accordance with claim 1, wherein said through-hole in said wall opens adjacently to the spark gap of the spark plug.

3. A jet-stream control combustion engine in accordance with claim 1, wherein said injection port is directed to the spark gap of the spark plug or the vicinity thereof.

4. A jet-stream control combustion engine in accordance with claim 1, wherein said intake and jet valves are both mushroom-shaped and axially parallel.

5. A jet-stream control combustion engine in accordance with claim 1, wherein said intake and jet valves are actuated by the same rocker arm.

6. A jet-stream control combustion engine in accordance with claim 1, wherein said jet body has a hexagonal portion formed in part of said jet body which protrudes above the cylinder head so that the jet valve fitted in the jet body may be screwed into the jet piece, in conjunction with the valve spring and retainer mounted on the jet valve stem.

7. A jet-stream control combustion engine in accordance with claim 1, wherein the auxiliary intake passage is sealed by the receiving surface of said jet body.

8. A jet-stream control combustion engine in accordance with claim 1, wherein said jet body is fitted in said through hole in conjunction with an elastic ring fitted in a circular groove cut in the outside surface of the jet body, said elastic ring sealing the auxiliary intake passage.

9. A jet-stream control combustion engine in accordance with claim 5, wherein the distance from the pivoted axis of said rocker arm to the actuated point of said jet valve is substantially smaller than the distance therefrom to the actuated point of said intake valve.

10. A jet-stream control combustion engine in accordance with claim 1, wherein an annular gap is left between the outside surface of said jet body and the inside surface of said through-hole, said annular space constituting a part of the auxiliary intake passage.

11. A jet-stream control combustion engine in accordance with claim 10, wherein the auxiliary intake passage formed in the cylinder head to open to said annular auxiliary intake passage formed over the outside surface of the jet body and the hole connecting the annular auxiliary intake passages inside and outside the jet body open in axially staggered positions.

12. A jet-stream control combustion engine in accordance with claim 1, wherein a gap is left between the inside surface at the combustion-chamber-side end of said through-hole and the outside surface at the lower end of said jet piece.

13. A jet-stream control combustion engine in accordance with claim 1, wherein a filler of high heat-conductivity is applied on the screwed portions of said jet piece and body.

14. A jet-stream control combustion engine in accordance with claim 1, wherein said jet body is made of spheroidal-graphite or malleable cast iron.

* * * * *